May 10, 1927.

W. A. TURBAYNE 1,628,079

DOUBLE CIRCUIT STARTING AND GENERATING SYSTEM

Filed Feb. 3, 1921  3 Sheets-Sheet 1

Fig. 3. Motor.

Fig. 2. Generator.

INVENTOR.
William A. Turbayne.
BY Raymond H. Van Vleet
ATTORNEYS.

May 10, 1927.

W. A. TURBAYNE 1,628,079

DOUBLE CIRCUIT STARTING AND GENERATING SYSTEM

Filed Feb. 3, 1921　　　3 Sheets-Sheet 3

Motor.

INVENTOR.
William A. Turbayne.
BY
ATTORNEYS.

Patented May 10, 1927.

1,628,079

UNITED STATES PATENT OFFICE.

WILLIAM A. TURBAYNE, OF NIAGARA FALLS, NEW YORK, ASSIGNOR TO U. S. LIGHT & HEAT CORPORATION, OF NIAGARA FALLS, NEW YORK, A CORPORATION OF NEW YORK.

DOUBLE-CIRCUIT STARTING AND GENERATING SYSTEM.

Application filed February 3, 1921. Serial No. 442,055.

The present invention relates to double circuit starting and generating systems.

More particularly the present invention relates to electrical systems of the type in which the dynamo-electric machine is adapted to be mechanically driven to supply current for a storage battery and translating devices. The dynamo-electric machine illustrated and described in the present application is of the type known as a double circuit generator. Said double circuit generator has two outside circuits, one of which supplies a storage battery and the other of which supplies translating devices. When said dynamo-electric machine is inoperative to develop the E. M. F. required for said translating devices, the battery discharges to supply current to said devices. A problem has been to effect transfer of the translating devices from the generator to the battery or vice versa, without causing an undesirable disturbance in the voltage at said devices. In the case of lighting devices, such voltage disturbance has caused a very unpleasant flickering of the lights. It is also desirable that the dynamo-electric machine may have motoring functions to start an internal combustion engine which, after being started, operates as the prime mover of the system.

An object of the present invention is to provide a novel starting and generating system involving a dynamo-electric machine in which all windings are utilized in an efficient manner to provide a high starting torque.

A further object is to provide a double circuit system involving a generator, a storage battery and translating devices, in which said translating devices may be transferred from generator to battery or vice versa, without disturbance of voltage conditions.

A further object is to provide a selective switch for controlling the connection of a translation circuit to one or the other of two sources of E. M. F.

Further objects will appear as the description proceeds.

Referring to the drawings:—

Fig. 2 illustrates the circuits established under generating conditions.

Fig. 3 illustrates the circuits established under motoring conditions.

Figure 1:
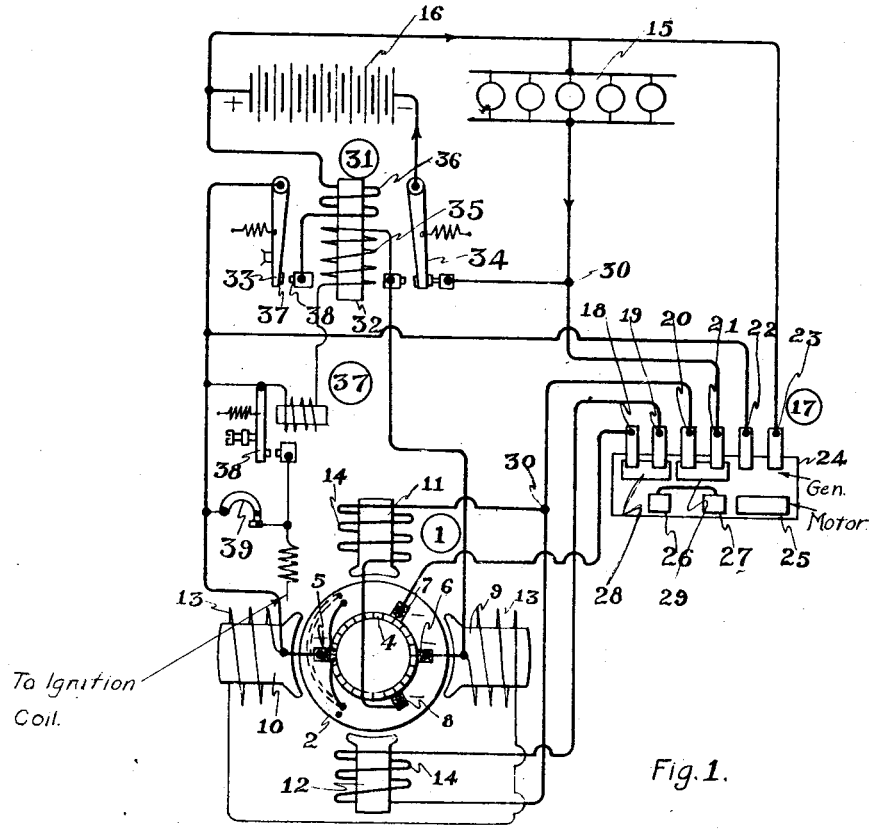
Fig. 1 illustrates schematically a system involving the present invention.

Referring first to Fig. 1, the dynamo-electric machine is indicated by the numeral 1. Said dynamo-electric machine 1 is of novel form and is illustrated herein in simple manner for the purpose of simplifying the description. A bipolar structure is disclosed. It will be evident, however, that the number of poles may be multiplied as desired, as long as the electrical and mechanical relations are maintained. According to the machine illustrated, a field structure sets up a main magnetic flux threading the armature. Means are also provided for setting up a flux for modifying the main flux. The dynamo-electric machine 1 is provided with armature 2 having conductors 3 arranged to form coils. The ends of each coil are connected by symmetrically arranged end connectors to adjacent bars of the commutator 4. Figure 1 illustrates one of these coils but it will be understood, of course, that additional coils are distributed around the armature. Bearing on the commutator 4 are a pair of brushes 5 and 6. Said brushes 5 and 6 are arranged 180 electrical degrees apart with reference to the main field of flux which will be described hereinafter, and are connected to supply field excitation for the machine. Said brushes with the symmetrically arranged end connectors for the armature conductors will be located in line with the main field flux. Arranged substantially 60 degrees on either side of brush 6 are brushes 7 and 8, which, under generating conditions, are connected to one another and through the translation circuit, to the brush 5.

The dynamo-electric machine 1 has a pair of pole pieces 9 and 10 which are diametrically arranged on oppisite sides of armature 2. Spaced midway between pole piece 9 and pole piece 10 are modifying pole pieces 11 and 12. The main pole pieces are provided with field windings 13—13, connected across brushes 5 and 6, while each of the modifying pole pieces 11 and 12 is provided with a series winding 14. Under generating conditions, series windings 14—14 will produce common polarity in pole pieces 11 and 12, whereby to modify the main magnetic flux. Under said generating conditions, the effect of the common polarity of pole pieces 11 and 12 will be to so modify the field flux as to cause the field distribution in part of the armature to resemble that in a four pole machine, while the distribution in the remainder of the armature resembles that in a bipolar machine.

The translation circuit is indicated by the numeral 15 and the storage battery is indicated by the numeral 16. The starting switch is indicated by the numeral 17. Said starting switch 17 may be in the form of a rotary segmental device, having a series of relatively stationary contacts 18, 19, 20, 21, 22, 23. Switch 17 also comprises a rotary segment 24 provided with insulated contact 25, adapted when the switch is in motoring position, to bridge contacts 22 and 23. Rotary segment 24 is also provided with a pair of insulated contacts 26 and 27 which are connected together and are adapted, when the switch is moved to motoring position, to engage with contacts 19 and 21 respectively. The rotary segment 24 is also provided with a pair of insulated contacts 28 and 29. Under generating conditions contact 28 is adapted to bridge the stationary contacts 18 and 19, while contact 29 is adapted to bridge stationary contacts 20 and 21. The rotary segment 24 will be biased to generating position, that is, the position in which contact 28 bridges stationary contacts 18 and 19, while contact 29 bridges stationary contacts 20 and 21. As illustrated in Fig. 1, brush 8 is connected through the upper winding 14 to the point 30. Said point 30 is connected to the stationary contact 20 and also is connected through the lower winding 14 to the stationary contact 19. Brush 7 is connected to the stationary contact 18. Stationary contact 23 is connected to one side of the translation circuit 15 and to one side of the storage battery 16. Sationary contact 22 is connected to the brush 5 of the dynamo-electric machine 1. Stationary contact 21 is connected to the other side of the translation circuit 15 and is adapted, under conditions which will be set out hereinafter, to be connected to the other side of the storage battery 16.

The numeral 31 indicates a switch mechanism which has the dual function of operating as an automatic switch and as a transfer switch. Operating as an automatic switch, said mechanism 31 will serve to connect the dynamo-electric machine 1 to the storage battery 16 at such times as the dynamo-electric machine 1 is developing a voltage equal to or greater than the C. E. M. F. of said storage battery 16. At other times said switch mechanism 31 will open the circuit between said battery 16 and the dynamo-electric machine 1 and will complete a direct circuit between the battery 16 and the translation circuit 15. When switch 17 is in motoring position, said mechanism will connect battery 16 to dynamo-electric machine 1 for motoring functions. The mechanism 31 is provided with a magnetic core 32 adapted, when energized, to attract the armatures 33 and 34, which armatures are biased to a position away from said magnetic core 32. Magnetic core 32 is energized by the voltage coil 35, which is connected across brushes 5 and 6 of the dynamo-electric machine 1. Said magnetic core 32 is also provided with a series holding coil 36 adapted to act cumulatively with the voltage coil 35 to hold armature 33 in attracted position. Armature 33 controls the engagement of a pair of contacts 37—38, which contacts, when in engagement, close circuit from the brush 5 through holding coil 36 to one side of the storage battery 16 and translation circuit 15. The armature 34 controls the connection of the storage battery to the brush 6 and to translation circuit 15. When said armature 34 is in unattracted position, translation circuit 15 is connected across storage battery 16. When armature 34 is in attracted position, the direct connection between battery 16 and the translation circuit 15 is broken and storage battery 16 is connected across brushes 5 and 6 of the dynamo-electric machine.

The numeral 37 indicates a relay for automatically stopping an internal combustion engine which is used as the prime mover of the system. Said relay 37 may be responsive to the voltage across the system, being connected in series with the coil 35 across the brushes 5 and 6. This relay 37 will operate upon attainment of a predetermined voltage to attract an armature 38 to short circuit the contact breaker 39 of the internal combustion engine. The voltage at which relay 37 operates may be chosen at a value above which it is not desirable to charge storage battery 16. Instead of having a relay responsive to the voltage across the system, any other preferred type of relay may be used, as for instance, an ampere hour meter which is responsive to the net input to the storage battery 16. If preferred, no automatic means need be provided for stopping the charge.

Figures 4, 5:
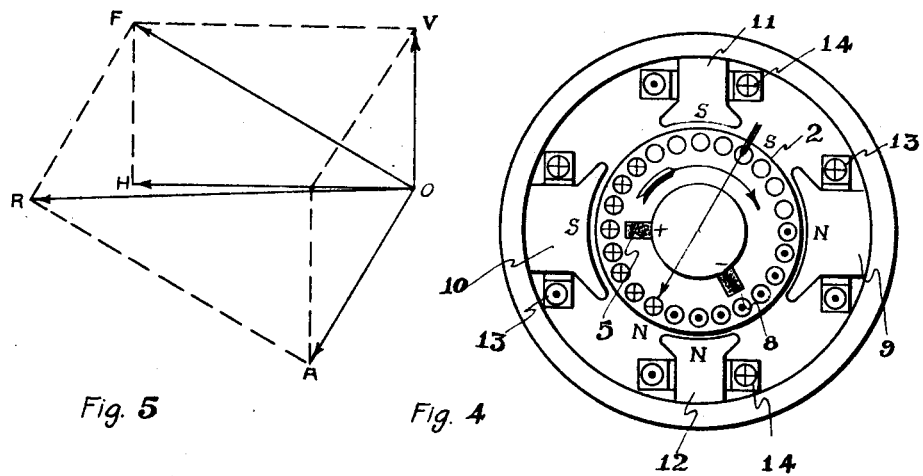
Fig. 4 illustrates the directions of current, magnetic forces and torque under motoring conditions.
Fig. 5 is a vector diagram illustrating the magnetic forces developed under motoring conditions.

A mode of operation of the above described embodiment of the invention is substantially as follows: When it is desired to operate the dynamo-electric machine 1 with motoring functions for the purpose of starting an internal combustion engine, the operator will move switch 17 to motoring position, which will establish connections shown in Fig. 3. Current from the storage battery 16 will pass to stationary contact 23 through movable contact 25 to contact 22, proceeding to brush 5, traversing armature 2 and leaving by way of brush 8, passing through the upper series coil 14, through the lower series coil 14 to the contact 19, through contacts 26, 27 and 21, through armature 34, to the negative pole of the storage battery 16. The current in traversing the armature through brushes spaced 120 degrees apart, will set up a field of flux as indicated in Fig. 4. The axis of said field of flux will be displaced 30 degrees from the vertical in a clock-wise direction, as indicated by the arrow in Fig. 4. The poles 11 and 12, which will have the polarity indicated in Figs. 3 and 4, will now exert a powerful compensating effect in opposing the armature cross flux and incidentally, exert a strong compounding effect. The result is a high torque compound motor with strong series characteristics.

Referring to the vector diagram, Fig. 5, O—H indicates in direction and magnitude the magnetic force imparted by the horizontal shunt field windings 13—13, while O—V indicates that contributed by the vertical auxiliary pole windings 14—14. O—F indicates the resultant magnetic force imparted by both shunt and series field windings.

O—A represents the armature magnetizing force substantially perpendicular to O—F, and the resultant of all the magnetizing forces within the machine is given by O—R, which is substantially in line with the main field poles 9—10. The projection of point A on line O—H gives the amount of compounding effect produced by armature alone and which is added to that produced by the shunt field poles 9—10.

It will be evident that while the armature conductors thereafter exert a powerful compounding effect, the armature magnetic axis bears the proper quadrature relationship to the main flux axis O—F to develop maximum torque.

After the engine has been started and is effective to drive the dynamo-electric machine with generating functions, the circuit conditions illustrated in Fig. 2 will be established. Under generating conditions, voltage of different values may be obtained at different brushes. Brushes 7 and 8 will have common polarity, indicated as minus and will be connected together to constitute one side of an electrical circuit, the other side of which is the brush 5. Brushes 5 and 6 constitute the terminals of another electrical circuit. When a predetermined effective voltage is developed across brushes 5 and 6, the voltage winding 35 of the switching mechanism 31 will be sufficiently energized to attract armature 33 to circuit closing position. Current may now flow from the generator 1 to the external circuit, this current leaving the positive brush 5 and returning through the translation circuit 15 to the point 30, through windings 14—14 in parallel to the negative brushes 7 and 8. The upper winding 14 should be connected to the brush 8 while the lower winding 14 should be connected to the brush 7, for reasons that are set forth in applicant's co-pending application, Serial No. 336,707, filed November 8, 1919. Windings 14, 14, as stated hereinbefore, have common polarity and will modify the flux produced by windings 13, 13 to hold the voltage across brushes 7 and 8 on the one hand, and brush 5 on the other hand, to a constant value, as explained in application No. 336,707 above referred to.

When the current through the coil 36 reaches a predetermined definite value, the armature 34 will be attracted and the battery 16 will now be connected across the high voltage brushes 5 and 6, the lamps still being supplied from the low voltage brushes. The lamp circuit is not opened during the transition stage and no arcing can occur across the contacts provided by the armature 34. At this transition period the lamps are being supplied from two sources of similar voltage value connected in parallel, the separation of the right hand contacts simply withdrawing one of the sources.

Figure 6:
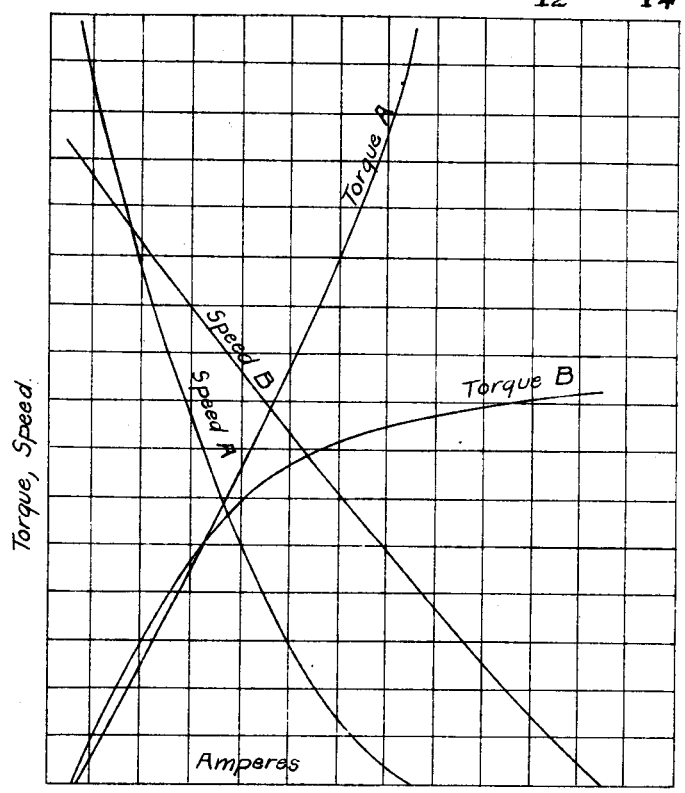
Fig. 6 illustrates the performance curves representing the advantages produced by the present invention.
Figure 7:
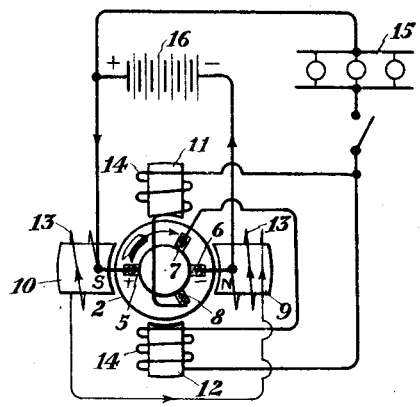
Figs. 7 and 8 are explanatory diagrams.
Figure 8:
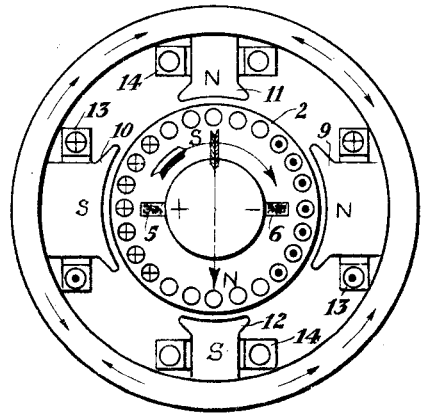

Figs. 6, 7 and 8 illustrate the advantages of the connections as disclosed in Fig. 1 over other connections which may appear to be proper. In Fig. 6, speed curve A and torque curve A represent conditions wherein current is admitted at the brush 8 on one side and brush 5 on the other side, as in Fig. 3. Speed curve B and torque curve B represent conditions wherein current is admitted at brushes 5 and 6, across which the battery is connected when the machine operates as a generator. The latter condition results in a very low torque as compared with that produced by the improved arrangement of connections illustrated in Fig. 1.

Fig. 7 illustrates a system of connections producing conditions as shown in curves B.

Fig. 8 illustrates the direction of current and flux, under motoring conditions, with current admitted through brushes 5 and 6, as in Fig. 7. The armature cross flux shown by the vertical arrow passes through a low reluctance path including the poles 11 and 12, which have no opposing magnetizing action. As illustrated by the arrows in the field frame in Fig. 8, this cross flux, acting with the main field flux, results in opposing effects in two quadrants of the field frame (shown as the upper right hand and the lower left hand quadrants) and in cumulative effects in two quadrants (shown as the upper left hand and lower right hand quadrants). By saturation in the last mentioned quadrants, with consequent increase in reluctance, the horizontal flux, which produces torque, is reduced. Under the conditions as illustrated in Figs. 7 and 8 the machine acts like an interpole motor without interpole windings, so that the interpoles exaggerate the distorting effect of the armature current upon the main flux. The strong vertical flux not only contributes no starting torque, but, on the other hand, exerts a locking tendency which must be overpowered by the effective armature conductors.

One embodiment of the present invention has been described in detail. Many modifications will occur to those skilled in the art. It is intended in this patent to cover all such modifications that come within the scope of the invention as defined by the appended claims.

What I claim as new and desire to secure by Letters Patent of the United States, is—

1. In a starting and generating system, in combination, a dynamo-electric machine having main poles and an armature winding, a storage battery, a translation circuit and a switching mechanism for directing current through said machine, said machine having certain of its brushes so arranged that motoring current through said armature will produce a flux in quadrature relation to the resultant of the field flux produced by said main poles and said modifying poles, said modifying poles being provided with means for modifying the field flux under generating conditions for regulating purposes.

2. In combination, a dynamo-electric machine having main poles, modifying poles located between said main poles, an armature winding having a pitch of 120 electrical degrees relative to said main poles, a pair of brushes and another brush spaced 60 electrical degrees from one of said pair of brushes, a storage battery, and switching mechanism, said switching mechanism being adapted to direct current from said battery through said armature winding and around said poles, said armature winding being supplied through one of said first pair of brushes and said other brush.

3. In combination, a dynamo-electric machine having main poles, modifying poles located between said main poles, an armature winding having a pitch of 120 electrical degrees relative to said main poles, a pair of brushes and two other brushes spaced 60 electrical degrees on either side of one of said pair of brushes, a storage battery, a translation circuit, and switching mechanism, said switching mechanism being adapted to direct current through said armature winding and around said poles, said armature winding being supplied through one of said pair of brushes and one of said other brushes, said switching mechanism being also adapted to direct current from said armature around said modifying poles to said storage battery.

4. In a starting and generating system, a storage battery, a dynamo-electric machine having main poles, modifying poles and an armature winding which co-operate to bring about a quadrature relation between the field flux and the armature flux while said battery is supplying current to said machine for motoring functions, and switching means for directing current, during the performance of generating functions, around said modifying poles for regulating purposes.

5. In a system, in combination, a storage battery, translating devices, a dynamo-electric machine having two outside circuits, one supplying said storage battery and the other supplying said translating devices, and switching means responsive to the voltage across one of said circuits and also responsive to the current flow to said battery and said translating devices for governing the connection of said battery and said devices to said machine and for governing the connection of said battery to one or the other of said circuits.

6. In a system, in combination, a storage battery, translating devices, a dynamo-electric machine having a pair of brushes across which a relatively high voltage exists, other brushes of common polarity under generating conditions, a combined automatic switch and translating device switch, said switch being provided with a voltage coil connected across said dynamo-electric machine and with a coil responsive to current flow to said battery and devices, said switch being provided with means for connecting one of said high voltage brushes to said battery and devices and with means for selectively connecting said battery to said devices or to the other high voltage brush.

7. In a system, in combination, a storage battery, translating devices, a dynamo-electric machine having a pair of circuits of different voltages, switch means for connecting said devices and said battery in one of said circuits and for changing the connection of said battery from one circuit to the other circuit.

8. In a system, in combination, a storage battery, translating devices, a dynamo-electric machine having a pair of circuits of different voltages, switch means for connecting said devices and said battery in one of said circuits and for changing the connection of said battery from one circuit to the other circuit, said switch means comprising a plurality of switch members and a common electromagnetic operating member.

9. In a system involving a dynamo-electric machine which under generating conditions has modifying poles for distorting the main flux in response to certain characteristics of the machine for regulating purposes, a storage battery and switch means for directing current around said modifying poles during the performance of motoring functions to bring about a quadrature relation between armature and field flux.

10. In a system, a dynamo-electric machine having main poles, modifying poles spaced midway between said main poles, an armature winding having a pitch of 120 electrical degrees relative to said main poles, a pair of brushes placed at points of maximum potential, other brushes spaced substantially 60 electrical degrees on either side of one of said pair of brushes, a storage battery, translating devices and switch means for connecting said translating devices between said brushes of common polarity on one side and one of said pair of brushes on the other side, the circuit of said translating devices including windings on said modifying poles, and for connecting said battery across said pair of brushes, said switch means being adapted to direct flux through said armature winding for motoring functions by way of the windings on said modifying poles, one of said brushes of common polarity and one of said pair of brushes.

11. In a starting and generating system, a dynamo-electric machine, said machine being provided with modifying means for modifying the field flux to produce a quadrature relation between the resultant field flux and the armature cross flux under motoring conditions, said modifying means being provided with windings for modifying the field flux under generating conditions for regulating purposes.

12. In a starting and generating system, a dynamo-electric machine, a pair of outside circuits supplied by said machine at different voltages, said machine being provided with modifying means for modifying the field flux to produce a quadrature relation between the resultant field flux and the armature cross flux under motoring conditions, said modifying means being provided with windings for modifying the field flux under generating conditions for regulating purposes.

In witness whereof, I have hereunto subscribed my name.

WILLIAM A. TURBAYNE.